United States Patent [19]

Wiley et al.

[11] 4,007,366
[45] Feb. 8, 1977

[54] RADIOACTIVE TRACER PROFILING SYSTEM AND APPARATUS

[75] Inventors: Ralph Wiley, Tulsa, Okla.; Charley L. Veach, Alvord, Tex.

[73] Assignee: The Western Company of North America, Fort Worth, Tex.

[22] Filed: Nov. 21, 1975

[21] Appl. No.: 634,241

[52] U.S. Cl. .............................. 250/260; 250/269
[51] Int. Cl.² ........................................ G01V 5/00
[58] Field of Search ............................ 250/260, 269

[56] References Cited

UNITED STATES PATENTS

| | | | |
|---|---|---|---|
| 2,989,631 | 6/1961 | Bohn | 250/260 |
| 3,389,271 | 6/1968 | Gray | 307/235 R |
| 3,600,582 | 8/1971 | Davis | 250/260 |
| 3,894,584 | 7/1975 | Fertl | 250/260 |

OTHER PUBLICATIONS

Nucleonics, Feb. 1961, pp. 62, 63.

*Primary Examiner*—Dixon: Harold A.
*Attorney, Agent, or Firm*—Mason, Kolehmainen, Rathburn & Wyss

[57] ABSTRACT

A radioactive charge is ejected into the borehole and a subsurface unit including a radiation detector is moved upwardly through this charge a number of times. The total radiation count as the unit moves up through the charge is obtained by integrating the output of the radiation detector during the period when the counter output exceeds the background radiation. The integrated count is displayed on a digital display unit. Compensation is provided for background radiation within the borehole. Also correction is made for the dead time of the radiation detector so that an accurate indication of the total amount of radioactivity remaining in the borehole during successive runs is obtained.

22 Claims, 6 Drawing Figures

FIG. 6
FIG. 4
TRIANGLE METHOD
Run #1=100%
Run #2=100%
Run #3=88%
Run #4=44%
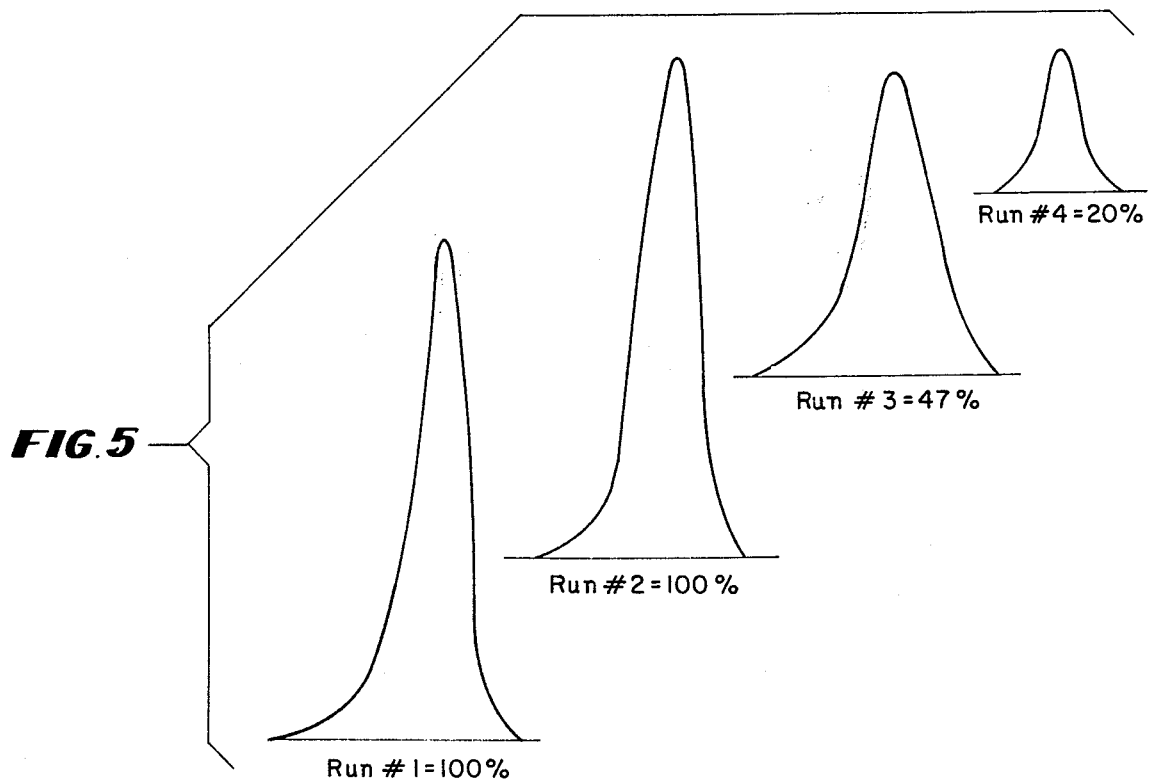
FIG. 5
Run #1=100%
Run #2=100%
Run #3=47%
Run #4=20%

RADIOACTIVE TRACER PROFILING SYSTEM AND APPARATUS

The present invention relates to systems and apparatus for obtaining a radioactive tracer profile of a well or borehole, and more particularly, to an arrangement for obtaining a radio-active tracer profile of a borehole wherein a charge of fluid containing a radioactive tracer element is injected into the well and measurements are made on this charge to determine the point or points along the borehole at which fluid is escaping from the borehole.

Various arrangements have been heretofore proposed for obtaining radioactive tracer profiles in boreholes. These arrangements in general fall into two different categories. The first category is a so-called velocity method wherein two radiation detectors which are spaced several feet apart in the same subsurface unit, are employed for the profiling operation and a charge of fluid which includes a radioactive tracer element, is injected into the well above the detector unit. The detector units are maintained stationary and the time required for the charge containing the radioactive tracer element to move downwardly in the borehole past both detector units is measured by plotting the outputs of both detectors and determining from the peak intensity points on each curve how long it took the radio-active charge to move past both detectors. Since the spacing between detectors is known the velocity with which the charge is moving may thus be determined.

While such velocity profiling systems are in widespread use, they are quite dependent upon borehole diameter. For example, a change of one inch in the diameter of the borehole may affect the results of a velocity profiling system by as much as five percent. Accordingly, it is necessary to make a caliper log of the borehole which usually requires a separate run in the borehole. Furthermore, since the velocity profiling system is one in which measurements are made with the detectors spaced from five to fifteen feet apart, the assumption is also made that the velocity of fluid flow is constant over this portion of the borehole. This assumption may again not be correct because of losses in the area in which the velocity profiling measurements are being made.

The velocity profiling arrangement is also based on the assumption that the injected charge moves with laminar distribution and flow through the area of the borehole in which the two detectors are located. This assumption is in many instances not correct since the borehole in this area may be quite irregular and include cavities, or the like. Furthermore, if the log is made within casing, scale and other build-up on the inside of the casing may produce a relatively rough, irregular surface over which the injected fluid must flow. As a result, turbulence and non-laminar flow is produced. Accordingly, even through a caliper log is employed to obtain the diameter of the borehole in the area in which velocity profiling is being made, this caliper log which may cut through the surface irregularities of the borehole, does not indicate the true diameter of the borehole insofar as fluid flow is concerned.

The second category of profiling arrangements is a so-called intensity or tracer method wherein a charge containing a radioactive tracer element is injected into the well and a subsurface unit including a single radiation detector is moved through the borehole so that it intercepts and passes through the entire charge containing the radioactive tracer. This procedure is repeated a number of times in correlation with the depth so that a number of logs of decreasing intensity are obtained. These logs are then correlated by measuring the total amount of radiation remaining in the injected charge at different depths within the borehole. Such measurements are usually made by approximating the curves which are obtained at different depths to a triangular shape and calculating from these assumed triangular shapes the point at which fluid is leaving the borehole. While such assumption of purely triangular shape may be valid at the point at which the charge is injected into the well, the injected charge rapidly becomes non-Gaussein in shape due to frictional forces and turbulence due to pipe irregularities. Accordingly, the assumed triangular shape becomes increasingly more inaccurate. Also, as the intensity of the burst diminishes and tracer material flows out of the well, the original shape of the injected charge changes greatly.

It is, therefore, an object of the present invention to provide a new and improved injection profile analyzing system and apparatus which avoids one or more of the above mentioned disadvantages of prior art arrangements.

It is another object of the present invention to provide a new and improved radioactive tracer profiling system and apparatus wherein a charge of radioactive material is injected into the injection well and facilities are provided for automatically taking the exact integral of the counting rate as a radiation detector is moved through the injected charge.

It is a further object of the present invention to provide a new and improved radioactive tracer profiling system and apparatus wherein a charge of radioactive tracer material is injected into the well and the point at which material leaves the well is determined by moving a radiation detector through the charge a number of times and obtaining the integral of the counting rate of the detector for each path through the injected charge, facilities also being provided for compensating for the dead time of the radiation detector so that an accurate measurement of the total intensity of the injected charge at different points in the well is obtained.

It is a still further object of the present invention to provide a new and improved radioactive tracer profiling system and apparatus wherein a charge of radioactive tracer material is injected into an injection well and the intensity of the injected charge at different points in the well is detected by moving the radiation detector through the charge a number of times and obtaining the integral of the detector counting rate for each pass, facilities also being provided for compensating for background radiation in the well so that an accurate indication is obtained of the point at which fluid leaves the well.

Briefly, in accordance with one aspect of the invention a subsurface unit is employed which includes means for injecting a charge of material into the borehole containing a radioactive tracer element and a radiation detector responsive to the radioactive tracer element of said charge. This radiation detector is arranged to develop a stream of pulses corresponding to the intensity of the tracer element as the detector is moved through the charge, said detector having a predetermined dead time. The detector stream of pulses is transmitted to the surface and a linear counting rate meter is employed to develop a first analog signal having amplitude proportional to the counting rate of said pulse stream at any given instant. A second analog signal is generated from said first analog signal which is corrected for the dead time of said radiation detector and said second analog signal is connected to a voltage controlled oscillator which develops control pulses at a frequency which is proportional to the amplitude of said second analog signal. A pulse counter is controlled by said control pulses and is operative to count the total number thereof as said unit is moved through said charge in the borehole, thereby providing an indication of the total amount of radioactive tracer material remaining in the charge as said subsurface unit is moved therethrough.

The invention, both as to its organization and method of operation, together with further objects and advantages thereof, will best be understood by reference to the following specification taken in connection with the accompanying drawings in which:

FIG. 1 is a block diagram of a radioactive tracer profiling system embodying the features of the present invention;

FIGS. 2 and 3 when positioned as shown in FIG. 2A comprise a schematic diagram of the injection profile analyzing system of the present invention;

FIG. 4 shows a typical series of runs during a conventional intensity or tracer method of injection profiling together with a triangle method of approximating the data acquired during these runs;

FIG. 5 shows the same series of runs when corrected for dead time of the radiation counter in accordance with the present invention; and FIG. 6 is a graph illustrating the relationship between the corrected and uncorrected counting rate of a typical radiation detector.

Figure 1:
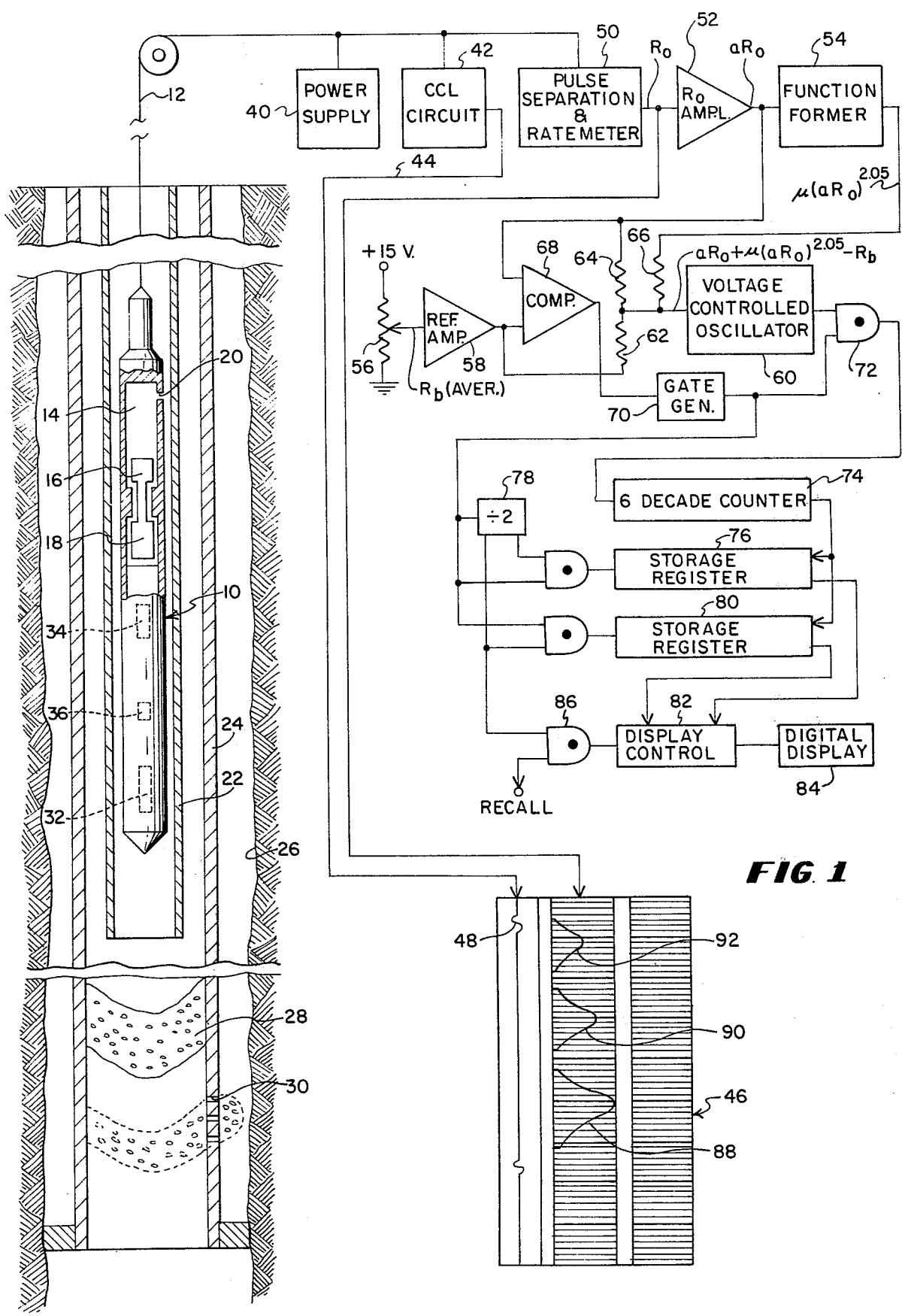

Referring now to the drawings, and more particularly to FIG. 1 thereof, the present invention is therein illustrated as comprising a subsurface unit indicated generally at 10 which may be lowered within the borehole by means of a cable 12. The subsurface unit 10 includes facilities for injecting a charge of fluid including a radioactive tracer element, these facilities including the reservoir 14 and positive displacement ejector 16 which is driven by the electric motor 18 so as to force a charge of fluid out of the opening 20 in the side of the subsurface unit 10.

Preferably the subsurface unit 10 is small enough to be inserted through small diameter tubing 22 which may be positioned within the main casing 24 in the borehole 26. After the subsurface unit 10 has been lowered to a predetermined point within the well, the motor 18 is energized by any suitable control means well known in the art to actuate the positive displacement ejector 16 so that a charge of fluid including a radioactive tracer element, such a $I_{131}$, is released within the casing 24, as shown by the mass of material 28 in FIG. 1. This charge of radioactive fluid material moves downwardly in the well and when exit points, such as the perforations 30 in the casing 24 are experienced, some of the radioactive fluid flows out of the well while the remainder of the charge continues to move downwardly. Accordingly, by first injecting a charge of radioactive tracer material into the well and then performing a number of runs upwardly through the radioactive charge while measuring the total intensity of this charge, an indication can be made as to the point within the well at which fluid is flowing out of the well. In this connection it will be understood that the well being analyzed is customarily an injection well which is normally employed in secondary recovery work and is positioned at the center of a pattern of wells in which recovery is to be increased by forcing fluid out of the injection well and into the surrounding formations so that the oil in these formations will be forced into the surrounding wells and may be recovered by any suitable means. During such a secondary recovery operation, it is important to know the points at which fluid is flowing out of the injection well so that the pattern can be changed as desired to accomplish maximum recovery from the surrounding wells.

In practicing the present invention, the subsurface unit 10 may comprise a subsurface unit which is customarily used in a velocity profiling system and includes first and second radiation detectors 32 and 34 and a centrally positioned collar locating coil 36. However, in accordance with an important aspect of the invention, only one of the radiation detectors 32, 34, is required to perform the necessary radiation intensity measurements within the borehole. It is contemplated that existing velocity profiling subsurface units may be employed with only one of the two radiation detectors 32, 34 active, thereby minimizing the expense of maintaining detectors while employing existing equipment in performing the method of the present invention.

Customarily, the radiation detectors 32, 34 are geiger counters which have a substantial deed time or resolution time during which the radiation detector is unresponsive to the surrounding radiation being measured. Typically, this dead time may be in the order of 250 microseconds. This means that the actual counting rate of the geiger counter does not represent the true radiation intensity. Thus, referring to FIG. 6 the counting rate $R_o$ is shown in relationship to the true counting rate $R_t$ when corrected for dead time of the geiger counter. It will be noted that the actual counting rate is substantially smaller than the true intensity and also varies nonlinearly with respect to the counting rate. Thus, for an actual counting rate of 1,000 counts per second the true counting rate is 1,500 counting rates per second whereas for an actual counting rate of 2,000 the true intensity is 4,000 counts per second.

In accordance with an important aspect of the present invention, the intensity measurements made by the radiation detector 32, for example, are automatically corrected for dead time. Also, in accordance with a further aspect of the invention the corrected intensity measurements are then integrated electronically so as to provide a display figure or number corresponding to the area under the curve for each of the runs performed by the subsurface unit 10 during a profiling operation. More particularly the surface equipment includes a power supply 40 which supplies power over the cable 12 to the electric motor 18 and also provides power for the high voltage required by the radiation detector 32 and suitable amplifiers for the pulse output thereof, as will be readily understood by those skilled in the art. The surface equipment also includes a casing collar locating circuit 42 which detects the casing collar pulses impressed on the cable 12 in the subsurface unit by the circuit 36 and provides suitable output pulses which are supplied over the conductor 44 to one channel of a strip type recorder indicated generally at 46, so that the casing collar signals 48 are produced in this channel coincident with each joint of the casing 24.

The pulses from the radiation detector 32 are transmitted over the cable 12 and are supplied to a pulse separation circuit 50 in which the radiation detector pulses are separated and applied to a linear rate meter so that the output of the circuit 50 consists of an analog signal $R_o$ corresponding to the radiation count rate of the detector 32 within the borehole. The $R_o$ signal is amplified in a scaling amplifier 52 so as to provide an output $aR_o$ at the output thereof. The output of the amplifier 52 is supplied to a function former 54 which provides an output $\mu(aRo)^{2.05}$, where $\mu$ is the resolving time of the radiation detector 32. This output value is derived from the following equation:

$$(R_t - R_o) = \frac{R_o}{1 - \mu R_o} - Ro \text{ where } \frac{R_t \simeq Ro + \mu(aRo)^{2.05}}{\text{or}} \\ \mu(aRo)^{2.05} \simeq R_t - Ro$$

where $R_t$ is the true count rate, $R_o$ is the observed count rate and mu is the resolving time of the radiation detector 32. Since this formula is a summation of expansion of terms, it may be realized to a first approximation by the value $\mu R_o^{2.05}$. In the range of count values experienced in normal tracer type well logging, i.e. when the counts of the counter 32 range from 0 to approximately 2,000 counts per second, the error introduced by the above approximation is less than 2 or 3 percent.

The advantage provided by the function former 54 in correcting for dead time of the radiation detector 32 in accordance with the present invention may be more clearly understood by reference to FIGS. 4 and 5. In FIG. 4 a series of typical profiling runs are shown using the prior triangle method for determination of the percentage intensity of radioactive material left in the injected burst at different points in the borehole. In the first two runs in FIG. 4 no radioactive material had left the well and each of these runs indicated a 100% radioactivity intensity for the injected charge. In run No. 3 the intensity was 88% of the initial intensity and in run No. 4 the intensity was 44%. In FIG. 5 these same runs have been corrected for dead time and the integrated area under the corrected curves is noted in FIG. 5. From this figure, it will be seen that run No. 3 shows a substantially reduced percentage, i.e. 47% of the initial intensity whereas the same run in FIG. 4 shows almost twice as much intensity left in the injected charge at that point in the well. Similarly, run No. 4 in FIG. 5 shows a retained radioactive intensity of only 20% whereas the same run in FIG. 4 shows a remaining intensity of 44%.

In many instances, there is a certain level of natural radioactivity in the borehole which will be detected by the radiation detector 32 and will introduce an additional error in the desired measurement of the intensity of the radioactive charge ejected into the borehole as this charge is measured during different runs with the detector 32. Prior to the injection profile measurement, a natural gamma ray log is made from the bottom of the well to the tubing, so that the background radiation at any point in the well is available. Usually such a natural gamma ray log has been made long prior to the injection profile measurement. However, if such natural gamma ray information is not available at the time an injection profile is to be made, a natural gamma ray log is made first. The background radiation $R_b$ at the depth of the well being investigated during the injection profile measurement is assumed to be constant over that interval and the setting of a potentiometer 56 is adjusted to give an analog input signal to a reference amplifier 58 which is proportional to the natural background radiation in the area under investigation.

The amplifier 58 amplifies the $R_b$ signal to a suitable level which is then combined in a summing network with the outputs of the units 52 and 54 to provide a composite signal which is supplied to the input of a voltage controlled oscillator 60. More particularly, the output of the amplifier 58 is supplied through the summing resistor 62 to the input of the oscillator 60, the output of the amplifier 52 is supplied through the summing resistor 64 to this input and the output of the function former 54 is supplied through the summing resistor 66 to the input of the oscillator 60. The oscillator 60 develops a stream of pulses the frequency of which varies in proportion to the summation voltage applied to the input of this oscillator.

The summation network operates to subtract a value proportional to $R_b$ from the outputs of the units 52 and 54 so that the voltage supplied to the oscillator 60 is compensated for background radiation. Accordingly, when the counting rate is due solely to background radiation, oscillator 60 has no output. However, since it is desirable to identify the output from oscillator 60 with discrete upward runs of subsurface unit 10 through radioactive charge 28 and to limit the integration of oscillator 60's output to the time intervals during which the count rate of radiation detector 32 exceeds the average background radiation comparator 68 is providing. One input of comparator 68 is supplied by the output of the amplifier 52. The other input of the comparator 68 is the output of the amplifier 58 which is proportional to the background radiation $R_b$. Accordingly, the comparator develops an output only when the counting rate of the radiation detector 32 exceeds the background level setting of the potentiometer 56. When this occurs, a signal is supplied to a gate generator 70 which in turn controls an AND-gate 72 to the other input of which is supplied the pulse stream output of the voltage controlled oscillator 60.

The output of the AND-gate 72 is supplied to a six decade counter indicated generally at 74. The counter 74 is thus effective to count the total number of pulses occurring during movement of the radiation detector 32 upwardly through the radioactive charge 28 which has been injected into the well. After the run has been completed, the total integral count of the counter 74 is stored in a first storage register 76. The subsurface unit 10 is then lowered through the injected radiation charge in order to make another upward run. When the counting rate of the detector 32 again increases above the background level as the unit 10 is lowered through the injected charge, the gate generator 70 provides an output signal which is supplied to a divide by 2 circuit 78 so that this circuit is effective to control storage registers 76 and 80 so that no information is stored in registers 76 and 80 while the subsurface unit 10 is being lowered through the injected radiation charge.

As another upward run of subsurface unit 10 is made and the counting rate of the detector 32 again increases above background level, the gate generator 70 again provides an output signal to the divide by 2 circuit 78 so that this circuit is now effective to switch the output of counter 74 to a second storage register 80. In this manner successive upward runs are successively stored in the registers 76 and 80. The total integral numbers stored in these registers are then supplied through a display control circuit 82 to a digital display 84, as will be described in more detail hereinafter, so that the integral value giving the total intensity of the injected charge after each run is provided on the digital display 84.

In some instances, the operator may wish to display the total intensity value of the injected charge which was obtained during the previous run. This may be achieved by supplying a recall signal to one input of the AND-gate 86 to the other input of which is supplied one of the outputs of the divide by 2 circuit 78. when this occurs, the digital display 84 is shifted to display the number stored in the other one of the registers 76, 80, as will be described in more detail hereinafter. If desired, the output of the rate member $R_o$ may be recorded on one channel of the strip type recorder 46, during successive runs in the borehole, as indicated by the curves 88, 90 and 92 in FIG. 1. Since these curves are made in correlation with depth, the depth at which a particular total integral value displayed on the display 84 was made can readily be determined, as will be readily understood by those skilled in the art.

Figure 2:
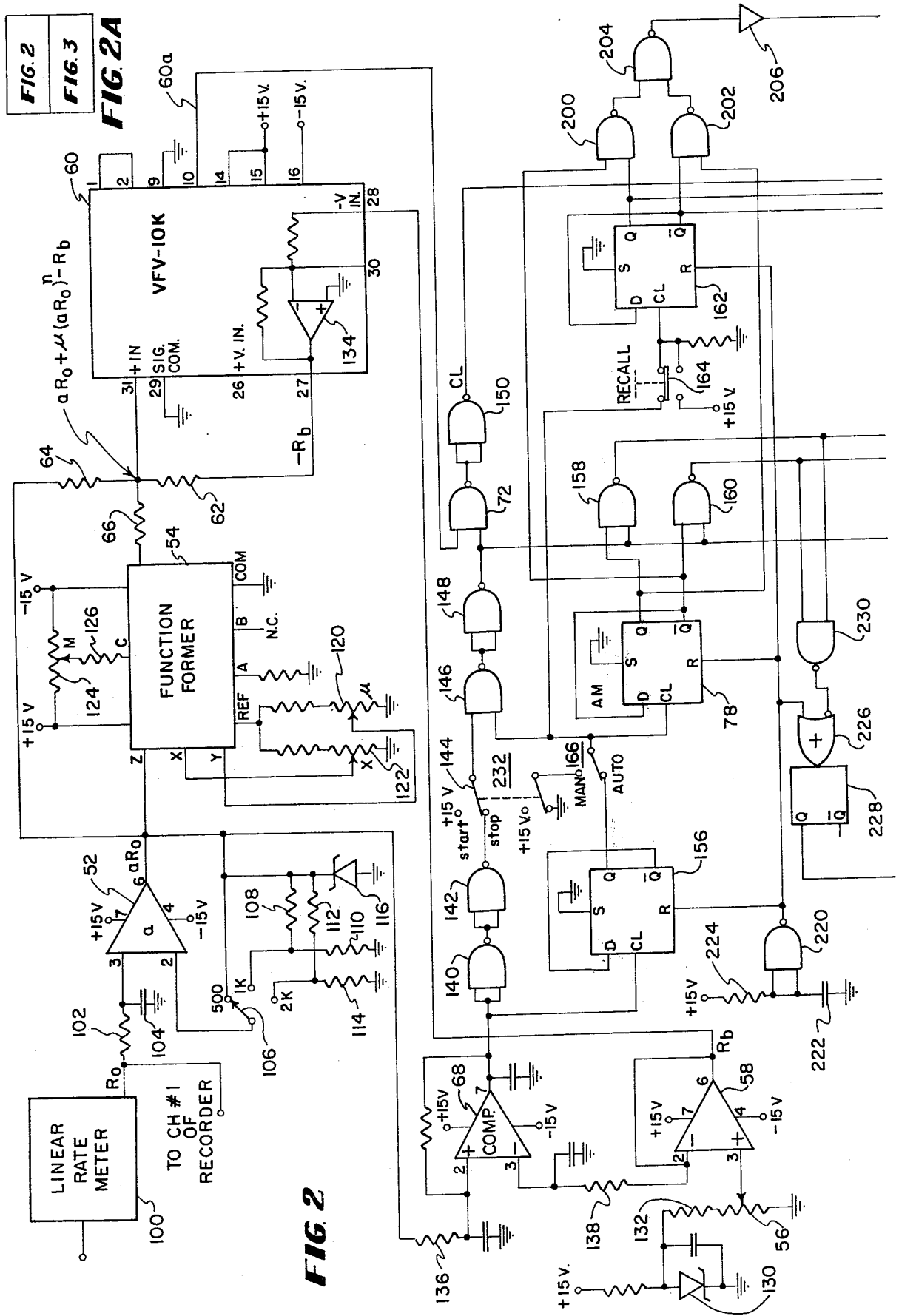
Figure 3:
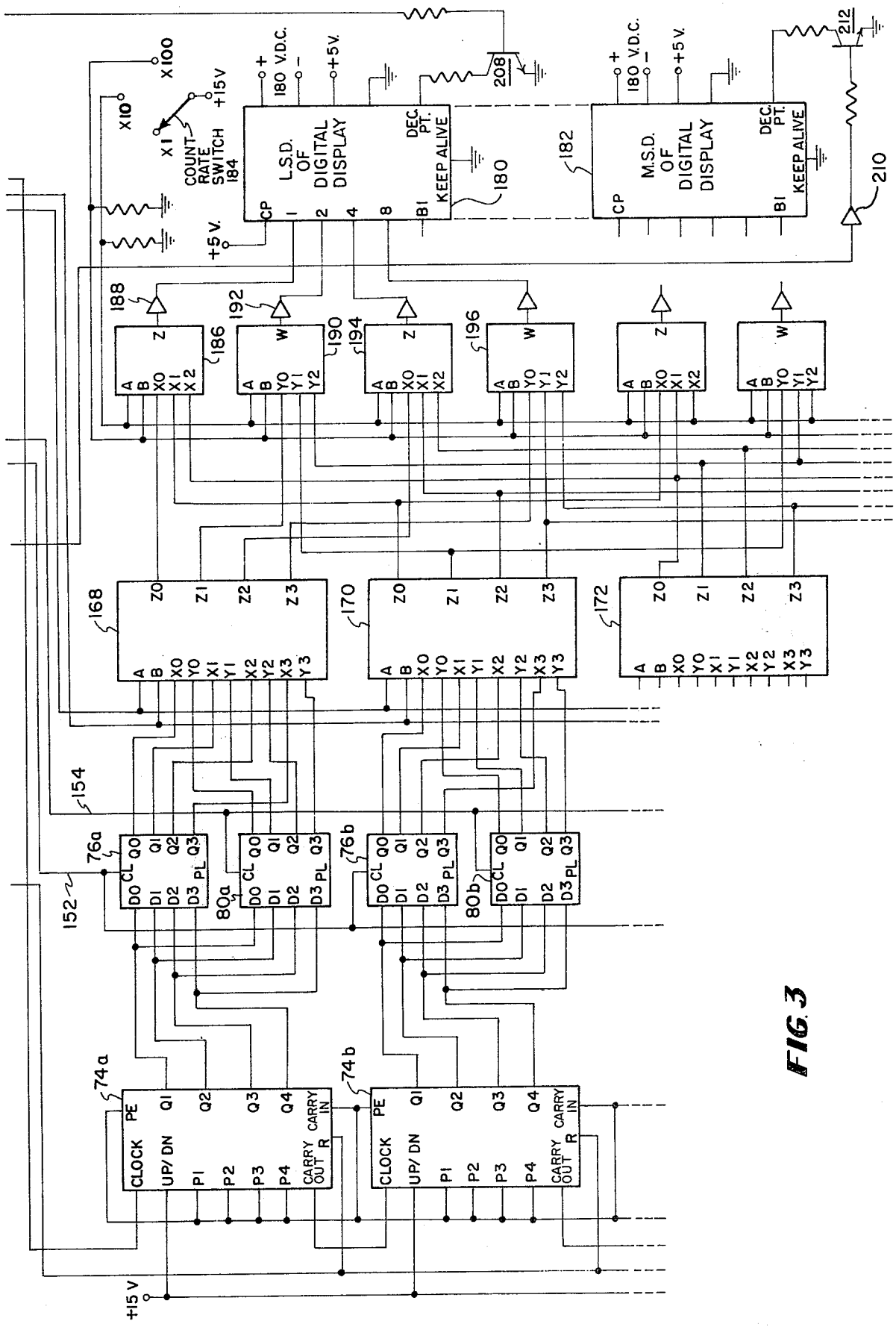

Referring now to FIGS. 2 and 3, wherein the detailed circuitry for the above described surface equipment of the present invention is shown, the linear rate meter 100 which forms a portion of the surface equipment unit 50, provides an output voltage proportional to the rate of occurrence of pulses developed by the radiation detector 32 in the subsurface unit 10 and this $R_o$ signal is supplied through an integration network including the series resistor 102 and the shunt capacitor 104 to one input of the scaling amplifier 52. In order to accommodate different frequency ranges of logging pulses developed by the rate meter 100, a range switch 106 is arranged to provide different scaling values for the amplifier 52. More particularly, when the switch 106 is in the 500 CPS position the output of the amplifier 52 is directly connected to the second input thereof through the switch 106. When the switch 106 is in the 1,000 CPS position the resistors 108 and 110 provide a voltage divided feedback to the input of the amplifier 52 and when the switch 106 is in the 2,000 pulses per second position the resistors 112 and 114 perform a similar voltage dividing action. The Zener diode 116 is connected across the output of the amplifier 52 to limit the maximum value of signal which can be produced at the output of this amplifier.

The function former 54 is preferably a multi function module type MF 435 made by Intronics Corporation. The generalized function performed by the module 54 is $Y(Z/X)^M$. Accordingly, the function former 54 is provided with a potentiometer adjustment 120 for the mu factor, the dead time of the radiation detector, so that radiation detectors having different dead times may be compensated in accordance with the present invention. The voltage developed at the arm of the potentiometer 120 is supplied to the Y input of the function former 54.

In order to accommodate the input range of the function former 54 to the various ranges of output signals provided by the scaling amplifier 52 the X input of the unit 54 is controlled by the potentiometer 122. The $aR_o$ output of the amplifier 52 is supplied to the Z input of the unit 54 and the exponent value M is provided by adjustment of the potentiometer 124, the arm of which is connected to the C terminal of the unit 54 through the resistor 126. The potentiometer 124 preferably may adjust the exponent value M between the values 2.02 and 2.07 so as to optimize performance of the equipment with various ranges of the other two variables X and Y.

The output of the function former is supplied to the summation network comprising the resistors 62, 64 and 66, as described in detail heretofore, this combined voltage being supplied to the voltage controlled oscillator 60. Preferably the oscillator 60 is an integrated circuit type VFV-10K made by Datel Systems, Inc.

A Zener diode 130 is arranged to provide a regulated voltage from the plus 15 volt supply which energizes the $R_b$ potentiometer 56 through the resistor 132. The potentiometer 56 is adjusted to the average background radiation in the area of the well under investigation, as described in detail heretofore, and is supplied to one input of the noninverting unity gain follower type amplifier 58 so that a signal proportional to background radiation $R_b$ is provided at the output of this amplifier. An inverting amplifier 134, which is a part of the integrated circuit forming the oscillator 60, is then employed to invert the signal output of the amplifier 58 so that a signal proportional to minus $R_b$ is supplied to the summing resistor 62.

The output of the scaling amplifier 52 is supplied through the resistor 136 to the noninverting input of the comparator 68 and the $R_b$ signal provided by the amplifier 58 is also supplied through the resistor 138 to the other input of the comparator 68. Accordingly, when the radiation detector count rate $R_o$ becomes larger than the average background radiation, as determined by the setting of the potentiometer 56, the comparator 68 develops an output which is supplied through the inverters 140 and 142, through the movable contact 144 of a start-stop switch 232, and through a NAND-gate 146 and inverter 148 to one input of a NAND-gate 72, to the other input of which is supplied the variable frequency pulse output developed by the oscillator 60 over the conductor 60a, as described in detail heretofore.

The output of the NAND-gate 72 is supplied through an inverter 150 as clock pulses to the clock pulse input of the first decade 74A of a six decade counter, two decades of which 74a and 74b are shown in FIG. 3. The six decades of the counter 74 are interconnected in the manner shown in FIG. 3 and the four outputs Q1, Q2, Q3 and Q4 of each decade are connected in parallel to a pair of storage latches. For example, the output conductors of the decade 74a are connected to the latches 76a and 80a. The six groups of latches 76 and 80 are controlled over the conductors 152 and 154, respectively, so that after an upward run through the injected radioactive charge has been completed the count of each one of the decades of the counter 74 is transferred to either the storage latches 76 or the storage latches 80.

In accordance with an important aspect of the invention, an arrangement is provided so that the operator may simply move the subsurface unit 10 up and down within the borehole through the radioactive injected charge so as to make successive runs in quick succession without requiring him to reset or restart the counters while at the same time storing successive upward runs in different ones of the latches 76 and 80. To this end, the output of the comparator 68 is employed as a control signal for a divide by 2 flip-flop 156. The output of the comparator 68 provides a positive going pulse during the period when the count rate $R_o$ of the radiation detector 32 exceeds the background level $R_b$. Accordingly, during the entire period when the logging instrument is being moved upwardly through the injected radioactive charge the comparator 68 provides a pulse output to the divide by 2 circuit 156. However, as soon as the injected charge is passed, and the count rate goes back down to the background level $R_b$, the comparator output goes negative and the divide by 2 circuit 156 changes state. When the operator moves the subsurface unit back down through the injected charge so as to prepare for the next upward run, the count rate is disregarded automatically since the output of the divide by 2 circuit 156 is now negative. However, when the operator again moves the logging instrument upwardly through the injected charge and the radioactive element in the charge produces a count rate above the background level, a positive signal is again developed by the comparator 68 which is transferred to the divide by 2 circuit 156. As a result, the circuit 78 is supplied with pulses corresponding only to upward runs through the borehole and these pulses are employed to control the circuit 78 so as to alternately provide output signals to the NAND-gates 158 and 160. These NAND-gates are also controlled by the output of the inverter 148 during manual operation, as will be described in more detail hereinafter. Accordingly, when an enabling signal is produced at the output of either the NAND-gate 158 or the NAND-gate 160 after an upward run has been completed, the count of the corresponding decades in the counter 74 is registered in one of the latches 76a or 80a.

In order to permit the operator to recall to the display unit 84 the integral count of the previous run, a divide by 2 circuit 162 is provided the clock input of which is normally connected through a recall switch 164 to the output of the divide by 2 circuit 156 through a manual-automatic switch 166. The divide by 2 circuit 162 controls a series of six dual one-of-two multiplexers three of which are indicated in FIG. 3 as the multiplexers 168, 170 and 172, the two outputs of the divide by 2 circuit 162 being supplied to the A and B leads, respectively of each of these multiplexers. The divide by 2 circuit 162 is normally operated in synchronism with the divide by 2 circuit 78 so that the multiplexer output leads Z0, Z1, Z2 and Z3 of each of the multiplexers 168, 170 etc. are alternately switched from the outputs of the latches 76 to the outputs of the latches 80. However, when the operator depresses the recall button 164 a plus 15 volt signal is supplied to the clock input of the divide by 2 circuit 162 so that this circuit is actuated to the opposite position and controls the multiplexers 168, 170, etc. to connect the other latches 76 or 80 to the multiplexer output conductors Z0, Z1, Z2 and Z3.

Considering now the remaining portions of the digital display arrangement of the present invention, in order to provide a simple and economical display which can be employed to display the numbers stored in the latches 76 or 80, a four-decade display unit is employed the least significant digit 180 of which and the most significant digit 182 are shown in FIG. 3. A count rate switch 184 is employed to select any four decades of the six-decade numbers stored in the latches 76 or 80. Thus, in the X1 position of the switch 184, the four least significant digits are displayed on the units 180, 182, etc.; in the X10 position the second to fifth digits are displayed; and in the X100 position of the switch 184 the four most significant digits are displayed. To accomplish this, a series of eight dual one-of-four multiplexers are connected to the output of the multiplexers 168, 170, etc. and three of the multiplexer inputs are employed for the three positions of the count rate switch 184. Thus, in the X1 position of the switch 184 the $Z_o$ output of the multiplexer 168 is supplied to the XO input of the first one-of-four multiplexer 186. This digit is supplied from the Z output conductor of the multiplexer 186 through the level shifter 188 to the LSD of the display 180. In a similar manner the Z1 output of the multiplexer 168 is supplied to the YO input of the one-of-four multiplexer 190 and through the level shifter 192 to the second digit of the display unit 180. The Z2 and Z3 outputs of the multiplexer 168 are similarly supplied through the one-of-four multiplexers 194 and 196 to the other digits of the display unit 180 so as to provide a visual indication of the least significant digit of the number stored in one of the latches 76a or 80 a.

When the count rate switch 184 is in the X10 position, the ZO output of the multiplexer 170 is supplied to the X1 input of the multiplexer 186 so as to provide a component of the least significant digit of the display 180. In a similar manner the other outputs of the multiplexer 170 are supplied to the X1 and Y1 inputs of the multiplexers 190, 194 and 196. Accordingly, in this position of the switch 184 the second to fifth digits of the numbers stored in the latch 76a or the latch 80a are displayed by the display unit 84. When the switch 184 is in the X100 position, the B inputs of the multiplexers 186, etc. are energized so that the ZO output of the multiplexer 172 is supplied through the multiplexer 186 to provide a digital component of the display unit 180. In an entirely similar manner the other multiplexers are connected to provide remaining digital components of the display 180. It will thus be seen that the four digital components of the display unit 180, and the other decade display units of the four-decade display, may be switched to display different portions of the range of the six-decade counter 74 depending upon the counting rate which is encountered during the profile analyzing operation.

In accordance with another aspect of the invention, when the recall button 164 is depressed by the operator a visual indication is provided to show that the integral count number being displayed corresponds to a previous run rather than the most recent run which has just been completed. More particularly, the outputs of the divide by 2 circuits 78 and 162 are supplied through the NAND-gates 200 and 202, and through the common NAND-gate 204 and the level shifter 206 to the base of a control transistor 208 the collector of which is connected to the decimal point terminal of the display unit 180. Accordingly, during periods when the recall button is depressed the outputs of the divide by 2 circuit 162 are reversed in polarity from the outputs of the divide by 2 circuit 78 so that the NAND-gates 200 and 202 provide output signals which in turn pass through the NAND-gate 204 and energize the transistor 208 so that the decimal point to the right of the least significant digit in the display 84 is illuminated to provide the operator with a visual indication that a recall integral count number is being displayed.

In accordance with a further aspect of the invention facilities are also provided for providing the operator with a visual indication that an upward run is being made during which the intensity of the radioactive material in the injected charge is being integrated. To this end, the output of the divide by 2 circuit 156, which controls the NAND-gates 146 and 148 during an upward run, is also supplied through the level shifter 210 to the base of a control transistor 212 the collector of which is connected to the decimal point input of the most significant display unit 182 of the four-decade display 84. Accordingly, during all periods when the intensity of the injected material is being measured the decimal point to the right of the most significant digit in the display 84 is illuminated to apprise the operator of this fact.

In order to reset all of the digital circuitry of the analyzing system when power is initially applied to the equipment, an inverter 220 is arranged to receive a positive pulse when the capacitor 222 is charged through the resistor 224 when power is initially turned on. The reset pulse produced at the output of the inverter 220 is supplied to the reset terminals of the circuits 156, 78 and 162 so as to return these circuits to their initial value when power is applied. In addition, the reset pulse is supplied to a one shot circuit 228 which has a NOR-gate 226 as its input, the output of this one shot being supplied to the reset terminals of all the fixed decade counters 74a, 74b, etc. These decade counters are also reset after each integrating period during an upward run through the borehole and after the count therein has been stored in one of the sets of latches 76 or 80. To this end, the NAND-gate 230 is connected to the outputs of the NAND-gates 158 and 160 and is triggered by the trailing edge of a pulse from either of these gates to supply an output to one input of the NOR-gate 226.

In some instances, it is desirable to manually control when the integration of the injected radioactive charge is to be initiated rather than relying upon the increase of the radioactive intensity above the natural background radiation, i.e. the setting of the potentiometer 56. For example, when a log is to be made near the bottom of the well the radioactivity due to the injected charge may be quite high due to previously injected charges since the flow in the well is downward. In such instance, it would be desirable to start the run upwardly and then control manually the point at which integration of the injected charge is started. To this end, the automatic-manual switch 166 and the start-stop switch 232 are employed, the switch 166 being thrown to the manual position and the start-stop switch 232 being initially thrown to the stop position. In the stop position of the switch 232, one input of the NAND-gate 146 is grounded through the manual-automatic switch 166 so that the NAND-gate 146 is not enabled and hence no clock pulses are supplied to the decade counters 74a, 74b, etc. However, when the start-stop switch 232 is thrown to the start position, a plus 15 volt signal is applied through the switch section 144 to one input of the NAND-gate 146 and a plus 15 volt signal is also supplied through the other section of the switch 232 and the manual-automatic switch 166 to the other input of the NAND-gate 146 so that this NAND-gate is enabled and pulses are supplied to the decade counters at a frequency proportional to the level of radioactive intensity at that point in the borehole, as described in detail heretofore. When the manual upward run is completed the switch 232 may be thrown to the stop position, thereby terminating flow of pulses from the voltage controlled oscillator 60 to the decade counters 74.

While the arrangement described above is the preferred embodiment of the invention, it may be modified by employing two separate voltage controlled oscillators, one controlled by the output of the units 52 and 54 and the other controlled by the output of the reference amplifier 58. The outputs of these two voltage controlled oscillators may then be supplied to a digital pulse subtractor to produce compensation for background radiation and the output of the pulse subtractor then being supplied as one input to the AND-gate 72. Also, while there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of said tracer as said detector is moved through said charge, said detector having a predetermined dead time, means for transmitting said stream of pulses to the surface, linear counting rate meter means for developing a first analog signal having an amplitude proportional to the counting rate of said pulse stream at any given instant, means controlled by said first analog signal for generating a second analog signal which is corrected for said dead time of said detector means, a voltage controlled oscillator having an input to which said second analog voltage is supplied and operative to develop control pulses at a frequency which is proportional to the amplitude of said second analog signal, and pulse counter means controlled by said control pulses and operative to count the total number thereof as said unit is moved through said charge in the borehole, thereby to provide an indication of the total amount of said radioactive tracer remaining in said charge as said unit is moved therethrough.

2. The system of claim 1, which includes means for developing an analog signal proportional to the natural radioactivity within the borehole in the area in which said charge is injected, and means for subtracting said natural radioactivity analog signal from said second analog signal so that said total indication is corrected for background radiation.

3. The system of claim 1, which includes means for producing a reference voltage proportional to the natural radioactivity within the borehole, comparator means for developing a gating pulse having a duration equal to the time interval that said second analog signal exceeds said reference voltage.

4. The system of claim 3, which includes storage register means connected to said counter means, digital to analog converter means, means for developing a control pulse at the end of said gating pulse, and means controlled by said control pulse for connecting said register means to said digital to analog converter means, thereby to provide an analog output signal from said converter proportional to the total amount of said radioactive tracer in said charge as said unit is moved therethrough.

5. The system of claim 1, which includes a source of reference voltage proportional to the natural radioactivity within the borehole in the area in which said charge is injected, comparator means controlled by said reference voltage and said first analog signal for developing a gating pulse having a duration equal to the time interval that said second analog signal exceeds said reference voltage, a second voltage controlled oscillator having an input to which said reference voltage is supplied and operative to develop second control pulses at a frequency proportional to said natural radioactivity, first and second counter means, means controlled by said gating pulse for connecting said first named control pulses to said first counter and said second control pulses to said second counter, and means connected to the output of said first and second counters for developing an analog output signal proportional to the total amount of said radioactive tracer element remaining in said charge as said unit is moved therethrough.

6. The system of claim 5, which includes storage register means connected to said first and second counters, and digital-to-analog converter means connected to said storage register means for developing said analog output signal.

7. The system of claim 6 wherein separate storage registers and digital-to-analog converters are provided for each of said first and second counters, and means for summing the outputs of said digital-to-analog converters to develop said analog output signal.

8. The system of claim 1, which includes means for producing a reference voltage proportional to the natural radioactivity within the borehole, comparator means for developing a gating pulse having a duration equal to the time interval that said first analog signal exceeds said reference voltage, whereby said total indication is corrected for background radiation within the borehole.

9. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of said tracer as said detector is moved through said charge, said detector having a predetermined dead time, means for transmitting said stream of pulses to the surface, linear counting rate meter means for developing a first analog signal having an amplitude proportional to the counting rate of said pulse stream at any given instant, means controlled by said first analog signal for generating a second analog signal which is corrected for said dead time of said detector means, a voltage controlled oscillator having an input to which said second analog voltage is supplied and operative to develop control pulses at a frequency which is proportional to the amplitude of said second analog signal, a source of reference voltage proportional to the natural radioactivity within the borehole, a second voltage controlled oscillator having an input to which said reference voltage is connected and operative to develop second control pulses at a frequency proportional to said reference voltage, pulse subtractor means connected to the outputs of said first and second voltage controlled oscillators, and a pulse counter controlled by said pulse subtractor and operative to produce a total pulse count proportional to the total amount of said radioactive tracer remaining in said charge as said unit is moved therethrough.

10. The system of claim 9, which includes comparator means for developing a gating pulse having a duration equal to the time interval that said second analog signal exceeds said reference voltage, and means controlled by said gating pulse for connecting the output of said pulse subtractor to said counter.

11. The system of claim 10, which includes a storage register connected to said counter and operative to register the count thereof, digital to analog converter means, means for developing a control pulse at the end of said gating pulse, and means controlled by said control pulse for connecting said register to said digital-to-analog converter means, thereby to provide an analog output signal from said converter proportional to the total amount of said radioactive tracer in said charge as said unit is moved therethrough.

12. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of said tracer as said detector is moved through said charge, means for transmitting said stream of pulses to the surface, linear counting rate meter means for developing a first analog signal having an amplitude proportional to the counting rate of said pulse stream at any given instant, means for developing an analog signal proportional to the natural radioactivity within the borehole in the area in which said charge is injected, means for subtracting said natural radioactivity analog signal from said first analog signal to provide an analog signal which is corrected for background radiation, a voltage controlled oscillator having an input to which said corrected analog voltage is supplied and operative to develop control pulses at a frequency which is proportional to the amplitude of said corrected analog signal, and pulse counter means controlled by said control pulses and operative to count the total number thereof as said unit is moved through said charge in the borehole, thereby to provide an indication of the total amount of said radioactive tracer remaining in said charge as said unit is moved therethrough.

13. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of said tracer as said detector is moved through said charge, means for transmitting said stream of pulses to the surface, means at the earth's surface and responsive to said stream of pulses for developing an electrical signal proportional to the intensity of said radioactive tracer element in said charge, means for integrating said electrical signal to obtain an output signal proportional to the total amount of radioactive tracer remaining in said charge as said unit is moved therethrough, means for developing a reference signal proportional to the radiation in said borehole prior to the injection of said charge into said borehole, and means controlled by said reference signal for controlling said integrating means so that it is operative only when said electrical signal exceeds said reference signal.

14. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radio-active tracer of said charge and arranged to develop a stream of pulses at a rate corresponding to the intensity of said tracer as said detector is moved through said charge, means for transmitting said stream of pulses to the surface, linear counting rate meter means for developing a first analog signal having an amplitude proportional to the counting rate of said pulse stream at any given instant, a voltage controlled oscillator having an input to which said analog voltage is supplied and operative to develop control pulses at a frequency which is proportional to the amplitude of said analog signal, pulse counter means controlled by said control pulses and operative to count the total number thereof as said unit is moved through said charge in the borehole, thereby to provide an indication of the total amount of said radioactive tracer remaining in said charge as said unit is moved therethrough, and means for indicating periods when the output of said voltage controlled oscillator is being supplied to said pulse counting means.

15. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of said tracer as said detector is moved through said charge, means for transmitting said stream of pulses to the surface, means at the earth's surface and responsive to said stream of pulses for developing an electrical signal proportional to the intensity of said radioactive tracer element in said charge, said means for developing an electrical signal comprising a linear rate meter, means for converting the output of said linear rate meter into a series of control pulses having a frequency of occurrence which is proportional to the amplitude of said output at any instant, and integrating means comprising a pulse counter controlled by said control pulses and arranged to provide an output indication corresponding to the total number of said control pulses.

16. The system of claim 15, which includes means for developing a reference signal proportional to the radiation in said borehole prior to the injection of said charge into said borehole, and means controlled by said reference signal for controlling said integrating means so that it is operative only when said electrical signal exceeds said reference signal.

17. In a system for obtaining the radioactive tracer profile of a borehole, the combination of, a subsurface unit, a cable connected to said unit for moving the same through the borehole, means in said unit for injecting a charge of material into the borehole which contains a radioactive tracer element, radiation detector means in said unit responsive to the radioactive tracer of said charge and arranged to develop a stream of pulses at a rate corresponding to the intensity of 097 said tracer as said detector is moved through said charge, means for transmitting said stream of pulses to the surface, linear counting rate meter means for developing a first analog signal having an amplitude proportional to the counting rate of said pulse stream at any given instant, a voltage controlled oscillator having an input to which said analog voltage is supplied and operative to develop control pulses at a frequency which is proportional to the amplitude of said analog signal, pulse counter means controlled by said control pulses and operative to count the total number thereof as said unit is moved through said charge in the borehole, thereby to provide an indication of the total amount of said radioactive tracer remaining in said charge as said unit is moved therethrough, first and second registers, and control means interconnecting said counter and said registers and operative to store alternate counts in said pulse counter means in said first and second registers corresponding to different traversals of said subsurface unit through said radioactive charge within the borehole.

18. The combination of claim 17, which includes a display device, and means for selectively connecting the output of said first and second registers to said display device.

19. The combination of claim 18, which includes means for indicating periods when the output of the register corresponding to the previous run is being displayed on said display device.

20. The combination of claim 19, wherein said display device includes a plurality of display units corresponding to different digits of the total integral count to be displayed, the least significant digit display unit having means for indicating a decimal point associated therewith, and means for energizing said decimal point indicating means during periods when the output of a register corresponding to a previous run is being displayed.

21. The combination of claim 18, wherein said pulse counting means and said registers can count and register a relatively large range of integrated radioactivity in said charge, said display device is arranged to display a limited range of integrated radioactivity in said charge, and switch means for connecting said display device to different groups of digits in said registers.

22. The combination of claim 21, wherein said pulse counter and registers have a range of six digits and said display device is switched to display any four digits of said six digit range.

* * * * *